Feb. 5, 1957  R. J. COAR  2,780,172
DUAL FUEL PUMP
Filed April 26, 1952  11 Sheets-Sheet 1

INVENTOR
RICHARD J. COAR
BY Jack N. McCarthy
AGENT

Feb. 5, 1957 — R. J. COAR — 2,780,172
DUAL FUEL PUMP
Filed April 26, 1952 — 11 Sheets-Sheet 4

INVENTOR
RICHARD J. COAR
BY Jack N. McCarthy
AGENT

FIG. 7

Feb. 5, 1957 R. J. COAR 2,780,172
DUAL FUEL PUMP
Filed April 26, 1952 11 Sheets-Sheet 7

FIG. 8

INVENTOR
RICHARD J. COAR
BY Jack N. McCarthy
AGENT

R. J. COAR 2,780,172

DUAL FUEL PUMP

Filed April 26, 1952

INVENTOR
RICHARD J. COAR

BY Jack N. McCarthy

AGENT

Feb. 5, 1957 R. J. COAR 2,780,172
DUAL FUEL PUMP
Filed April 26, 1952 11 Sheets-Sheet 11

FIG. 13

INVENTOR
RICHARD J. COAR
BY Jack N. McCarthy
AGENT

United States Patent Office 2,780,172
Patented Feb. 5, 1957

2,780,172
DUAL FUEL PUMP

Richard J. Coar, Hartford, Conn., assignor to United Aircraft Corporation, East Hartford, Conn., a corporation of Delaware Application April 26, 1952, Serial No. 284,517

22 Claims. (Cl. 103—10)

This invention relates to a dual fuel pump and control valving therein and applies particularly, though it is not limited thereto, to turbine engine fuel systems using gear type fuel pumps.

An object of this invention is to provide control valving for a dual fuel pump, whereby the two stages of the pump normally flow in series but automatically revert to parallel flow in the event that the flow demand exceeds the series flow capacity of the pump.

A further object of the invention is to provide automatically a flow from either stage of the pump in the event of failure of the other pump stage.

Further objects and advantages will be apparent from the following specification and drawings.

Figures 1, 12:
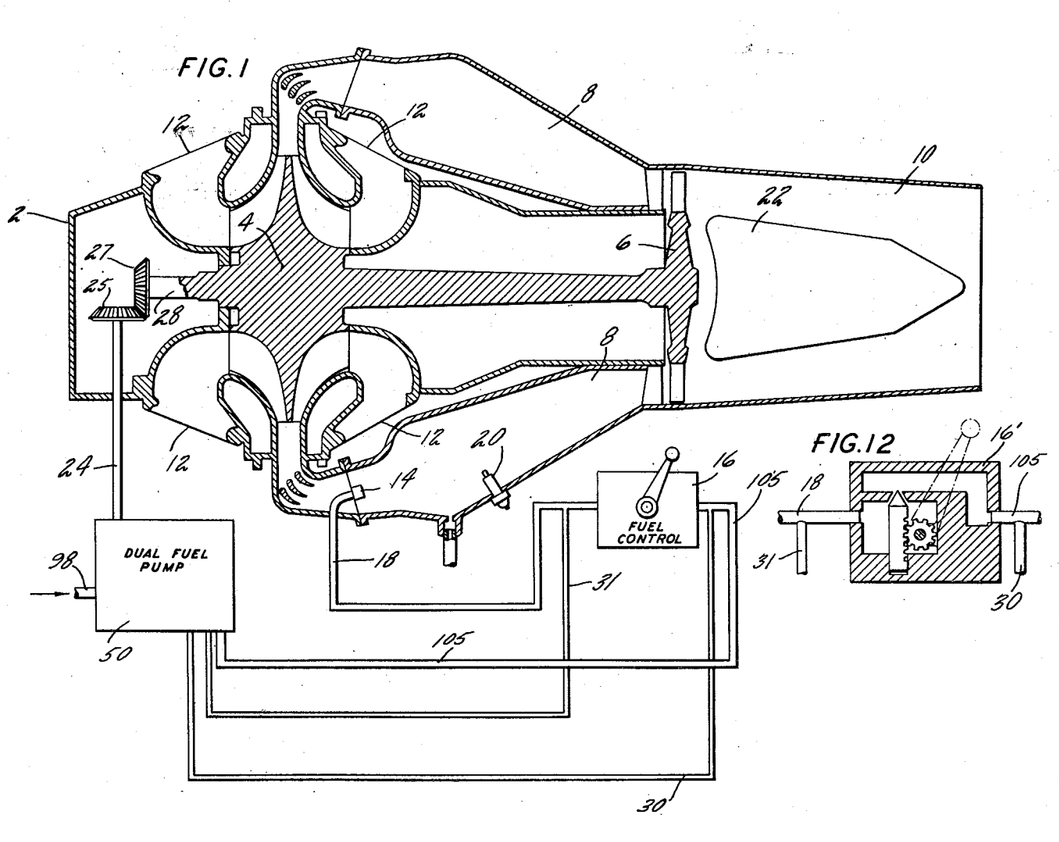
Fig. 1 is a schematic view of a turbojet engine with a dual flow pump and fuel control.
Fig. 12 is an enlarged sectional view of a simplified control.

The turbojet engine 2 has a compressor 4, which in the arrangement shown is a centrifugal type, driven by a turbine 6. Combustion chambers 8 therebetween deliver air from the compressor to the turbine. A tail pipe 10 is attached at the turbine outlet.

The engine 2 has two axially spaced annular intake openings 12 to direct the incoming air into two opposite facing annular inlets. Compressed air discharging from the compressor 4 passes to the turbine through the combustion chambers 8 where it is mixed with fuel from fuel nozzles 14. These fuel nozzles 14 receive fuel from the fuel control 16 through conduit 18. The fuel-air mixture is initially ignited within the combustion chambers 8 by a spark igniter 20. From the turbine, the gases pass around a cone 22 within tail pipe 10.

The dual fuel pump 50 for the fuel supply has two gear pumps 102 and 104 driven by a shaft 24 from a bevel gear 25 which is in turn driven by a bevel gear 27 fixed to a shaft 28 on the compressor. Fuel is supplied to this pump through a conduit 98 and is discharged through a conduit 105 to the fuel control 16 in a manner to be described hereinafter. Conduits 30 and 31 sense the pressure drop across the fuel control and are connected to the dual fuel pump 50 in a manner to be hereinafter described.

Figure 2:
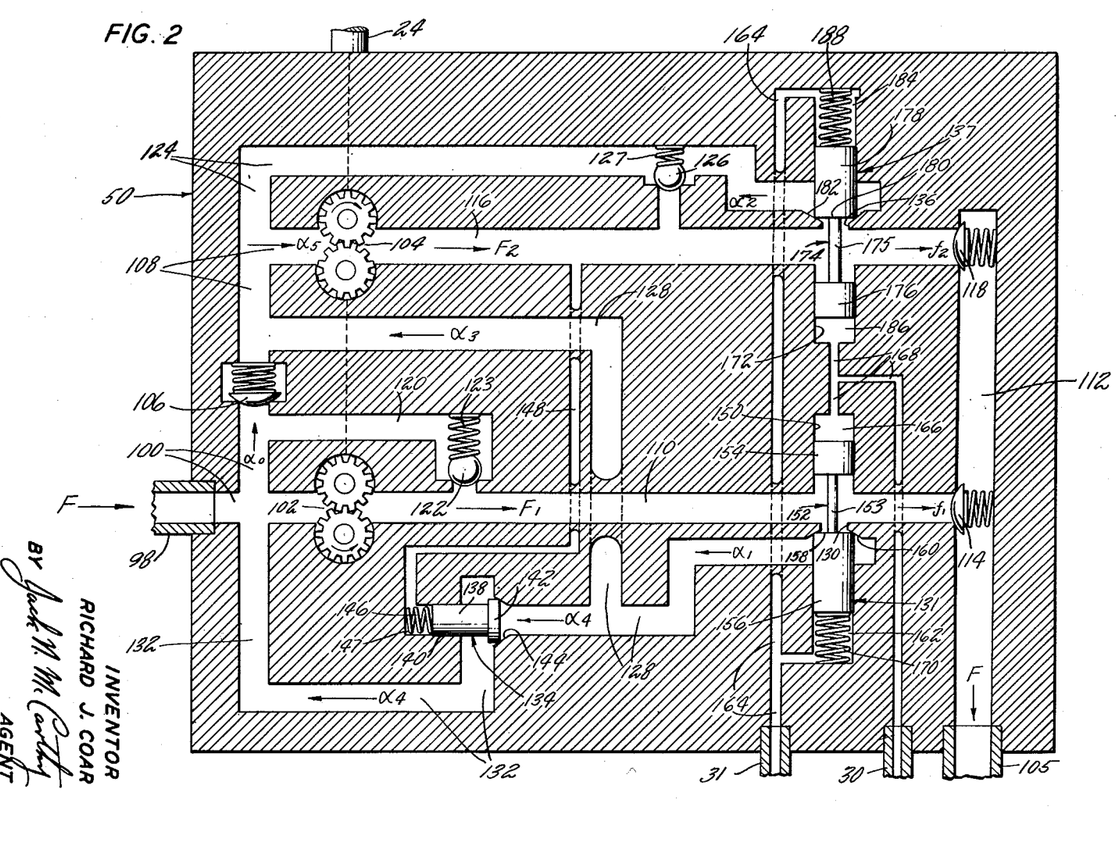
Fig. 2 is an enlarged schematic view of the dual fuel pump in an "at rest" position with the symbols for fuel flow being shown thereon in their respective passageways.

Referring to Fig. 2, conduit 98 is connected to an inlet passageway 100 of the dual fuel pump 50 which is in turn connected to the inlet of the first stage pump 102. Passageway 100 is also connected to the inlet of the second stage pump 104 through a check valve 106 and passageway 108. The outlet from the first stage pump 102 is connected to a passageway 110 which is in turn connected to an outlet passageway 112 of the dual fuel pump 50 through a check valve 114. The outlet of the second stage pump 104 is connected to a passageway 116 which is in turn connected to the outlet passageway 112 through a check valve 118. Outlet passageway 112 is directly connected to conduit 105.

Figure 3:
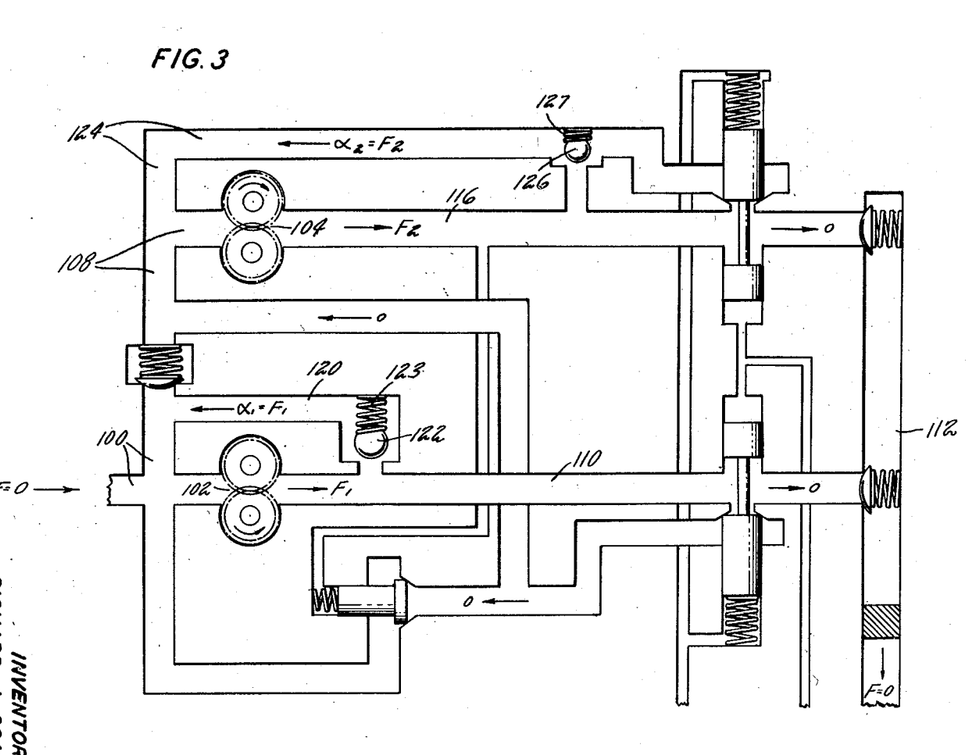
Fig. 3 is an enlarged schematic view of the dual fuel pump with its elements being shown in their respective positions when the outlet passage 112 has been obstructed.

Passageway 110 is also connected to passageway 100 by a passageway 120 through a relief valve 122. Passageway 116 is also connected to passageway 108 by a passageway 124 through a relief valve 126. These relief valves 122 and 126 are incorporated so that if the discharge from the first and second stage pumps 102 and 104 should be accidently or deliberately obstructed, for example as shown in Fig. 3, the pressure rise across these pumps would be limited to a safe value. Relief valve 122 opens when the pressure differential across said valve exceeds the setting of a spring 123 which holds it in a closed position and relief valve 126 opens when the pressure differential across said valve exceeds the setting of a spring 127 which holds it in a closed position.

Passageway 110 is connected to a passageway 128 by a port 130 which cooperates with a first stage regulating valve 131 in a manner hereinafter described. Passageway 128 is in turn connected to passageway 108 which leads to the inlet of the second stage pump 104. Passageway 128 is also connected to passageway 100, which leads to the inlet of the first stage pump 102, by a passageway 132 through a stage load control valve 134. Passageway 116 is also connected to passageway 124 by a port 136 which cooperates with a second stage regulating valve 137 in a manner hereinafter described.

The stage load control valve 134 consists of a circular piston having one end 138 of a small diameter and one end 142 of a large diameter. The small end 138 is slidable in a closed bore 140 and the large end 142 cooperates with a valve seat 144 formed between passageways 128 and 132, to present a variable orifice therebetween. A spring 146 is located in closed bore 140 between the end thereof and the end face of the small end 138 of the stage load control valve 134 to bias the large end 142 of the piston into cooperation with valve seat 144. This chamber 147 located between the closed end of bore 140 and valve 134, in which the spring 146 is located, is connected by a passageway 148 to passageway 116.

The first stage regulating valve 131 includes a bore 150 which intersects passageways 110 and 128 with port 130 being formed therebetween. Within bore 150 is a valve member 152 which consists of a piston having a reduced portion 153 and two lands 154 and 156 thereon. Land 154 slidably engages bore 150 adjacent passageway 110 and land 156 slidably engages bore 150 below port 130. This land 156 extends across passageway 128 and presents an edge 158 to a seat 160 of port 130 to form a variable orifice. Chamber 162 formed between land 156 and the one end of bore 150 is connected to conduit 31 by a passageway 164. Chamber 166 formed between land 154 and the other end of bore 150 is connected to conduit 30 by passageway 168. A spring 170 is located in chamber 162 between the end of land 156 and the end of bore 150 so as to urge the edge 158 of land 156 in a direction towards the seat 160.

Similarly, the second stage regulating valve 137 includes a bore 172 which intersects passageways 116 and 124 with port 136 being formed therebetween. Within bore 172 is a valve member 174 which consists of a piston having a reduced portion 175 and two lands 176 and 178 thereon. Land 176 slidably engages bore 172 adjacent passageway 116 and land 178 slidably engages bore 172 above port 136. This land 178 extends across passageway 124 and presents an edge 180 to a seat 182 of port 136 to form a variable orifice. Chamber 184 formed between land 178 and the one end of bore 172 is connected to conduit 31 by passageway 164. Chamber 186 formed between land 176 and the other end of bore 172 is connected to conduit 30 by passageway 168. A spring 188 is located in chamber 184 between the end of land 178 and the end of the bore 172 so as to urge the edge 180 of land 178 in a direction towards the seat 182.

While the conduit 30 is shown connected to the control inlet pressure, ($P_{105}$) and the conduit 31 is shown connected to the control outlet pressure, ($P_{18}$) this has been done merely to show the pump 50 connected to a control in one of its less complicated ways. It is to be understood that the pump 50 may be connected, if desired, to other lower or higher pressures within a control.

The regulating valves 131 and 137, of the first and second stage pumps 102 and 104, respectively, are of such a pressure balanced design that only the pressures acting on the ends of the valve members 152 and 174 and the forces exerted by springs 170 and 188, respectively, are effective to move said valves. In each regulating valve the pressure differential ($P_{105}$—$P_{18}$) acting on the area of the valve ends opposes the force of its respective spring 170 or 188. Spring 170 is set to open the first stage regulating valve at a predetermined pressure differential of $P_{105}$—$P_{18}$ which is represented by the symbol $\Delta 1$. Spring 188 is set to open the second stage regulating valve at a slightly higher predetermined pressure differential of $P_{105}$—$P_{18}$ which is represented by the symbol $\Delta 2$. The mean value of these pressure differentials may be set to any value required for proper operation of a turbine control 16 by controlling the size of the regulating valves or the force exerted by the springs. The spring tension for springs 170 and 188 may be varied as by a setscrew extending into the end of the bore for the spring and engaging a cap on the end of the spring.

The control 16 regulates the flow rate of fuel delivered to the combustion chambers 8. In effecting this regulation the control varies the fuel flow by presenting a larger or smaller effective metering orifice area between conduits 105 and 18. Since the pressure difference $P_{105}$—$P_{18}$ is regulated by the dual fuel pump 50, such changes in orifice area interposed between conduits 105 and 18 result in a greater or lesser fuel flow rate, in accordance with the demands of the fuel control. Although such controls are usually more complex than this disclosure implies, for the purpose of explaining the operation of dual fuel pump 50 the control 16 will be replaced by a simple control 16″ as shown in Fig. 12 which includes a single valve.

Figure 4:
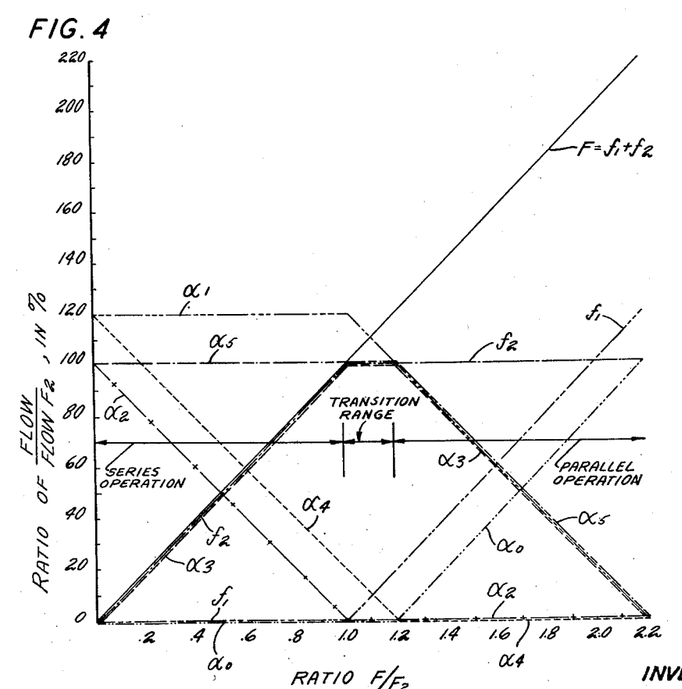
Fig. 4 is a flow chart wherein the flows indicated in the various passageways of Fig. 2 are plotted as a function of the parameter $F/F_2$.
Figure 5:
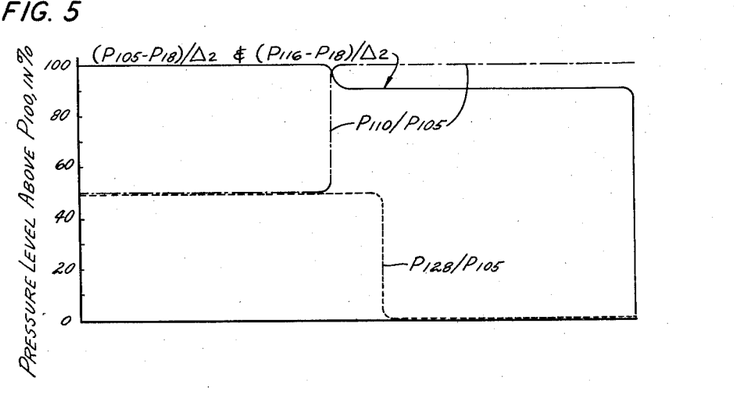
Fig. 5 is a pressure chart wherein the significant pressure levels are plotted as a function of the parameter $F/F_2$.

The performance of the dual fuel pump 50 can best be described in terms of the ratio of the flow F through the valve in control 16′ to the flow $F_2$ of the second stage pump 104 which ratio is $F/F_2$. The flows indicated in the various passageways of Fig. 2 are platted as a function of the parameter $F/F_2$ on the coordinate curves of Fig. 4 and the significant pressure levels are plotted as a function of the parameter $F/F_2$ on the coordinate curves of Fig. 5. In Fig. 4 the various passageway flows are plotted as non-dimensional ratios relative to the capacity of the second stage pump 104 to eliminate the variable of pump speed, so for purposes of the following description the pump speeds will be assumed constant. In Fig. 5 the pressures are plotted as non-dimensional ratios relative to the pressure above the pressure in the inlet passageway 100, ($P_{100}$) in percent, to provide a unique representation independent of the pressure level in conduit 18, ($P_{18}$). This pressure in the inlet passageway 100 ($P_{100}$) is assumed to be of a value less than the pressure in conduit 18 ($P_{18}$) and for the purposes of the following description it is assumed to be zero. The flows referred to above are defined below using the symbol for each flow:

$F_1$—the flow from the first stage pump 102
$F_2$—the flow from the second stage pump 104
$f_1$—the flow through check valve 114
$f_2$—the flow through check valve 118
$F$—$f_1+f_2$
$\alpha_0$—the flow through check valve 106
$\alpha_1$—the flow through the first stage regulating valve 131
$\alpha_2$—the flow through the second stage regulating valve 137
$\alpha_3$—the flow through passageway 128 from the first stage regulating valve to the passageway 108
$\alpha_4$—the flow through the stage load control valve 134
$\alpha_5$—$\alpha_2+\alpha_3$ The capacity (displacement per revolution) of the first stage pump 102 is designed in excess of the capacity of the second stage pump 104 for reasons hereinafter stated. The curves of Figs. 4 and 5 were obtained by assuming that the capacity of the first stage pump is 20% greater than the capacity of the second stage pump. The resulting performance, however, will be typical of other values of excess capacity.

When the valve in control 16′ is wide open there is a negligible pressure drop across it and therefore the differential $P_{105}$—$P_{18}$ approaches zero. Since it is this differential which is applied to the first and second stage regulating valves to operate them, at this position of the valve in control 16′, the springs 170 and 188, respectively, hold the valves in a closed position. The capacity of the first stage pump 102 ($F_1$) is delivered through check valve 114, and the capacity of the second stage pump 104 ($F_2$) is then delivered through check valve 118 to passageway 112, since no other passageways are open. At this point in the operation the flow $f_1$ is equal to $F_1$ and $f_2$ is equal to $F_2$ and the flow $F$ in passageway 112 and conduit 105 to the inlet of control 16′ is the sum of the flows $f_1$ and $f_2$ through the check valves 114 and 118, respectively. In this instance where the valve in control 16′ is wide open and the capacity of the first stage pump is 20% greater than the second stage pump, the following relationship holds since the full capacity of both first and second stage pumps is delivered to the conduit 105:

$$F = f_1 + f_2$$

and since $f_1 = F_1$ and $f_2 = F_2$ $$F = F_1 + F_2$$

and since $F_1 = 1.2 F_2$ $$F = 1.2 F_2 + F_2$$
$$F = 2.2 F_2$$

dividing by $F_2$ $$\frac{F}{F_2}=2.2$$

This relationship is represented in Fig. 4 at the point at which $F/F_2$ is equal to 2.2.

Figure 6:
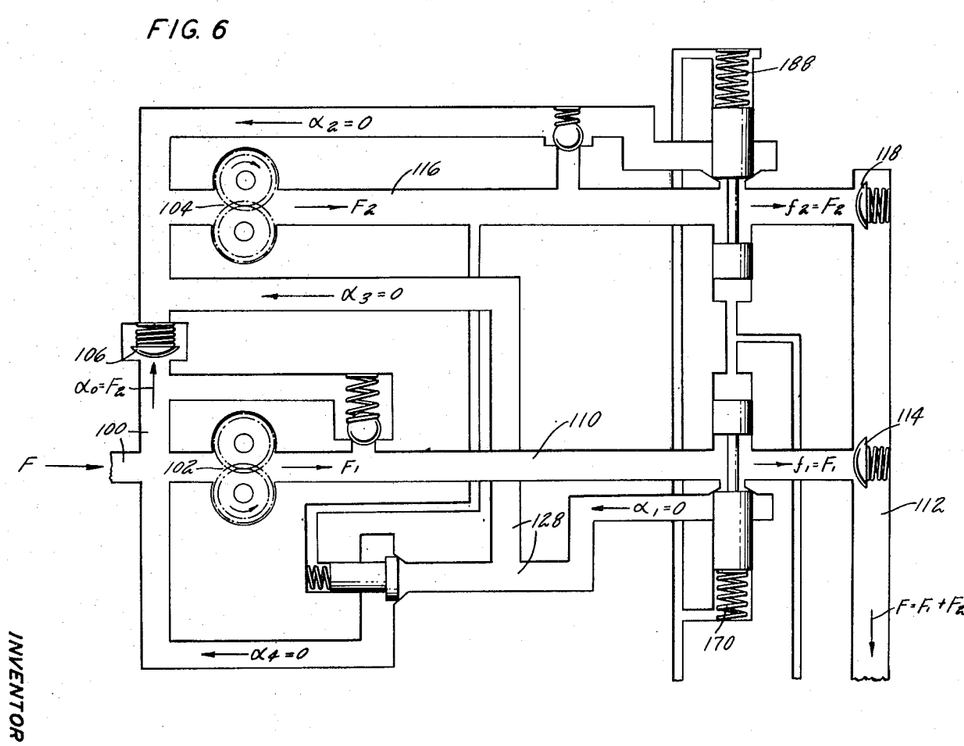
Fig. 6 is an enlarged schematic view of the dual fuel pump with its elements being shown in their respective positions when "full parallel" operation obtains.

The pressure in passageway 128 ($P_{128}$) is essentially equal to the pressure in passageway 100 ($P_{100}$) since there is only a negligible loss through check valve 106, therefore (since $P_{100}=0$) the value of the ratio $P_{128}/P_{105}$ is equal to zero as shown in Fig. 5 at the point at which $F/F_2$ is equal to 2.2. The pressure in passageway 110 ($P_{110}$) is essentially equal to the pressure in conduit 105 ($P_{105}$) since there is only a negligible loss through check valve 114, therefore, the valve of the ratio $P_{110}/P_{105}$ is equal to 1 as shown in Fig. 5 at the point where $F/F_2$ is equal to 2.2. The position of the various valves in the dual fuel pump 50 for the above described "full parallel" operation at $F/F_2=2.2$ is shown in Fig. 6.

As the valve in control 16′ is closed gradually from the wide open position described above, the flow ratio $F/F_2$ will be decreased. The changes occurring in the various passageway flows and pressure levels as the metering area in control 16′ is reduced, are shown reading from right to left in Figs. 4 and 5.

As the valve in control 16′ starts to close the restriction to flow increases and the pressure drop $P_{105}-P_{18}$ rises until it equals the spring setting $\Delta 1$ of the first stage regulating valve. Further closure of the valve in control 16′ tends to increase $P_{105}-P_{18}$, but the first stage regulating valve 131 opens in response to this increase and part of the flow $F_1$ of the first stage pump 102 can now be bypassed into passageway 128. This bypassing action limits the flow through the valve in control 16′ to a value compatible with $P_{105}-P_{18}$ equal to $\Delta 1$. Since the spring setting $\Delta 2$ of the second stage regulating valve is designed for a higher value of $P_{105}-P_{18}$ by some slight but finite amount, the second stage regulating valve remains closed, and for the range of flow $$F_1/F_2 < F/F_2 < \frac{F_1+F_2}{F_2}$$

the pressure differential $P_{105}-P_{18}$ is equal to $\Delta 1$ as regulated by the first stage regulating valve 131.

In this flow range the fuel flow $\alpha_1$ bypassed by the first stage regulating valve 131 into passageway 128 is always less than the flow capacity of the second stage pump 104 ($F_2$). The difference between $F_2$ and $\alpha_1$ must continue to flow through check valve 106 and this maintains the pressure in passageway 128 ($P_{128}$) at approximately the zero pressure of the inlet passageway 100 ($P_{100}$). This is shown in Fig. 4 as $P_{128}/P_{105}$ equals zero in the range of the ratio $F/F_2$ of 1.2 to 2.2. The discharge pressure of the second stage pump 104 ($P_{116}$) is approximately equal to the pressure in conduit 105 ($P_{105}$) the loss through the check valve 118 being negligible. This pressure is applied to chamber 146 through passageway 148 to hold the stage load control valve 134 closed.

Figure 7:
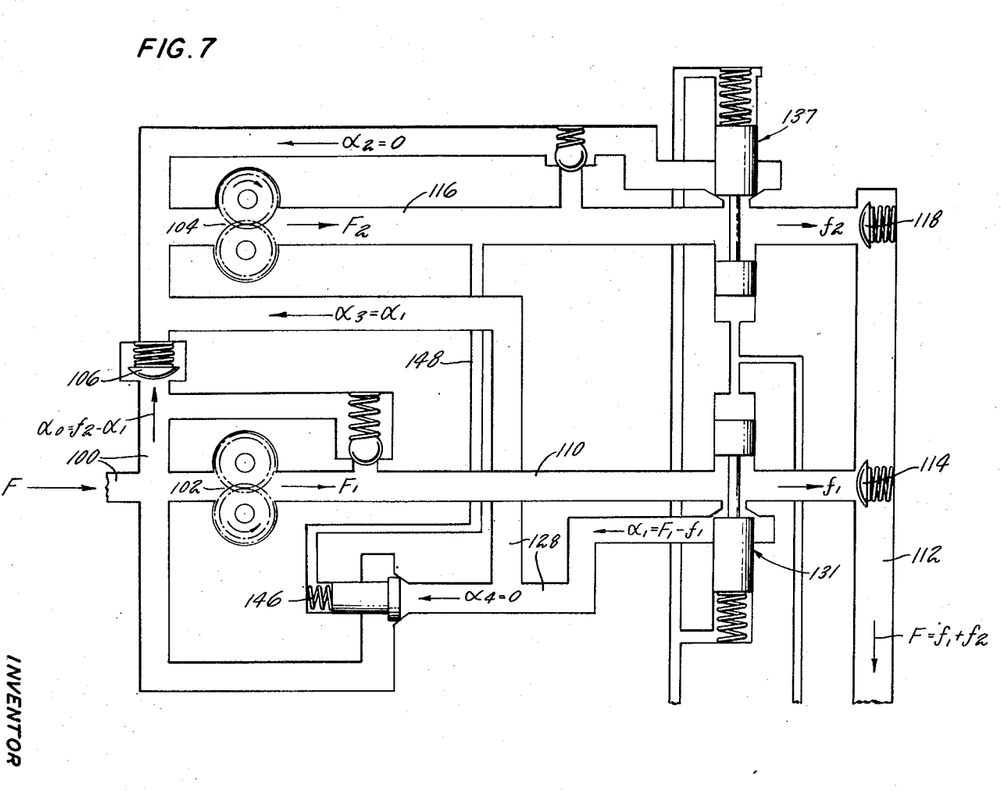
Fig. 7 is an enlarged schematic view of the dual fuel pump with its elements being shown in their respective positions when "parallel" operation obtains.

The position of the various valves in the dual fuel pump 50 for the above-described "parallel" range of operation where $$F_1/F_2 < F/F_2 < \frac{(F_1+F_2)}{F_2}$$

is shown in Fig. 7. In Figs. 4 and 5 this range is located between the values of the ratio $F/F_2$ of 1.2 to 2.2. These values are obtained as follows:

$$\frac{F_1}{F_2} < \frac{F}{F_2} < \frac{F_1+F_2}{F_2}$$

and since $F=1.2F_2$ $$\frac{1.2F_2}{F_2} < \frac{F}{F_2} < \frac{1.2F_2+F_2}{F_2}$$

$$\frac{1.2F_2}{F_2} < \frac{F}{F_2} < \frac{2.2F_2}{F_2}$$

$$1.2 < \frac{F}{F_2} < 2.2$$

Since the flow from both passageways 116 and 110 enters passageway 112 which is connected to conduit 105 with a negligible pressure drop, $P_{110}/P_{105}=100\%$ as shown in Fig. 5. As noted above, in this flow range of "parallel operation" $P_{105}-P_{18}=\Delta 1$. In Fig. 5, the value of $\Delta 1$ has been taken as 90% of $\Delta 2$, for convenience of presentation, proper functioning of the system being obtained for any ratio of $\Delta 1/\Delta 2<1$. Accordingly, $$(P_{105}-P_{18})/\Delta 2 = 90\%$$

as shown in Fig. 4. As described above, the first stage regulating valve 131 acts in the range $$F_1/F_2 < F/F_2 < \frac{F_1+F_2}{F_2}$$

to hold a constant pressure differential $\Delta 1$ across the valve in control 16′. Under these conditions the delivered flow is therefore proportional to the metering area provided by the valve in control 16′, and when this area is reduced to the point where $F/F_2=F_1/F_2$, 1.2 in the example shown, a "transition" mode of operation is entered. When this point is reached, that is when $F/F_2$ just equals $F_1/F_2$, it is apparent that the flow bypassed by the first stage regulating valve into passageway 128 just equals the flow capacity of the second stage pump 104, $F_2$. Under these conditions there is no flow through check valve 106 and therefore the pressure level in passageway 128 is no longer established by the pressure in the inlet passage 100 ($P_{100}$).

When the flow $F/F_2$ is just slightly less than $F_1/F_2$ it follows that the flow $\alpha_1$ bypassed by the first stage regulating valve into passageway 128 exceeds the flow which can be removed from passageway 128 by the second stage pump 104. This results in a rise in the pressure in passageway 128 ($P_{128}$), which causes the stage load control valve 134 to open so that the difference in flows $\alpha_1$ and $\alpha_3$ is bypassed to inlet passageway 100, this flow is referred to as $\alpha_4$. Neglecting the spring force acting on the stage load control valve 134 which is relatively inconsequential since it is used only to hold the valve closed under static conditions, if the area of the large end 142 of the valve is twice the area of the small end 138, the valve will open and close as required by bypassing fuel at flow $\alpha_4$ to passageway inlet 100 to maintain $$P_{128}-P_{100}=\frac{1}{2}(P_{116}-P_{100})$$

Since we have assumed the pressure in the inlet passageway 100 ($P_{100}$) to be zero, it follows that $P_{128}/P_{116}=50\%$, or $P_{128}/P_{105}=50\%$, there being a negligible difference between $P_{116}$ and $P_{105}$, as mentioned hereinbefore.

Figure 8:
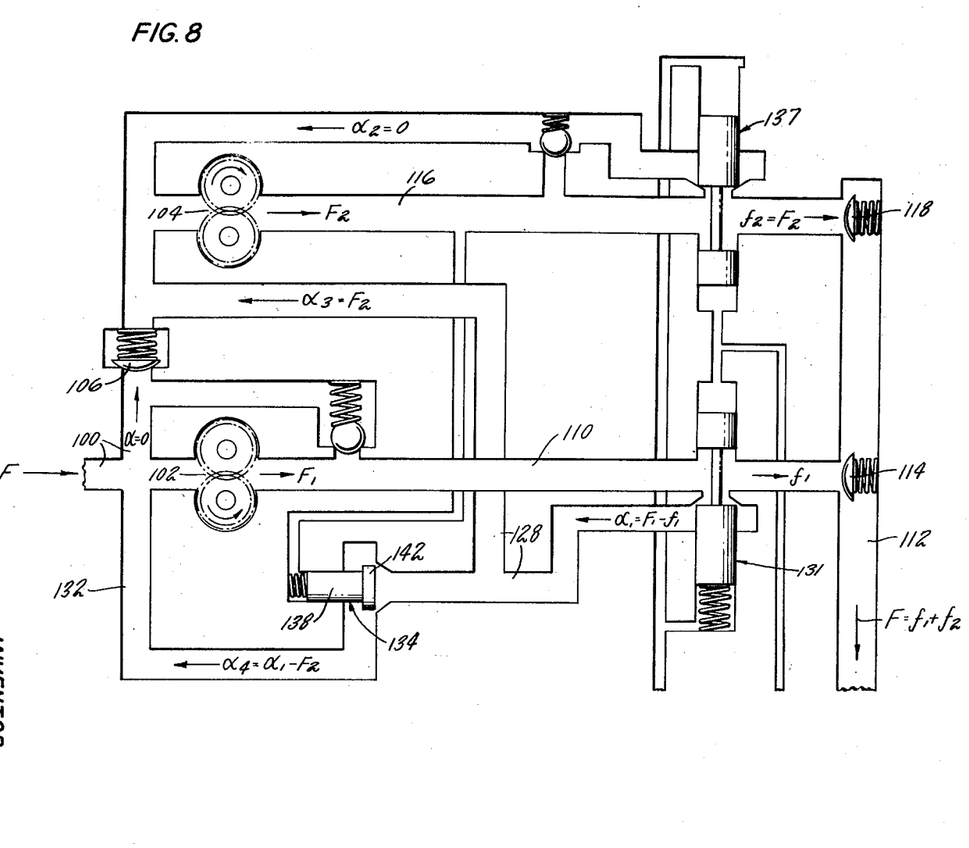
Fig. 8 is an enlarged schematic view of the dual fuel pump with its elements being shown in their respective positions when "series/parallel transition" operation obtains.

The position of the various valves in the dual fuel pump 50 for the above-described "transition" range of operation where $F_2/F_2<F/F_2<F_1/F_2$ is shown in Fig. 8. Since the fuel is still delivered to conduit 105 from both passageways 110 and 116, the regulation of the pressure differential $P_{105}-P_{18}$ is still controlled by the first stage regulating valve so that $(P_{105}-P_{18})/\Delta 2=\Delta 1/\Delta 2=90\%$, and $P_{110}/P_{105}=100\%$ as shown in Fig. 4. In Figs. 4 and 5 this range is located between the values of the ratio $F/F_2$ of 1.0–1.2. These values are obtained as follows:

$$\frac{F_2}{F_2} < \frac{F}{F_2} < \frac{F_1}{F_2}$$

and since $F=1.2F_2$ $$\frac{F_2}{F_2} < \frac{F}{F_2} < \frac{1.2F_2}{F_2}$$

$$1 < \frac{F}{F_2} < 1.2$$

Now, when the valve in control 16' is closed further to the point where $F/F_2$ is equal to or less than 1, that is when the metered flow is less than the flow capacity of the second stage pump 104, it is obvious that the action of the first stage regulating valve 131 becomes ineffective since it can bypass only from the outlet point of the first stage pump 102. Therefore the new position of the valve in control 16' results in an increase in the pressure differential $P_{105}-P_{18}$. When this differential rises to the value of $\Delta 2$ established by the spring setting on the second stage regulating valve 137 the valve is urged open to maintain the differential $P_{105}-P_{18}$ equal to $\Delta 2$ by bypassing the difference $\alpha_2$ back to the inlet of the second stage pump 104. Now all of the required flow to the control 16' passes through check valve 118.

This increase in pressure difference $P_{105}-P_{18}$ to $\Delta 2$ causes the first stage regulating valve 131 to become wide open so there is no obstruction between passageways 110 and 128. The stage load control valve 134 continues to operate as described hereinbefore, maintaining $P_{128}/P_{116}$ equal to $P_{128}/P_{105}$ equal to 50% as shown in Fig. 4, and, therefore, $P_{110}/P_{105}$ falls also to 50%. Since $P_{110}$ is now less than $P_{105}$, check valve 114 is held closed.

The position of the various valves in the dual fuel pump 50 for the above-described "series" range of operation where $0<F/F_2<1.0$ is shown in Fig. 8. In Figs. 4 and 5 this range is located between the values of the ratio $F/F_2$ of 0–1.0. These values are obtained as follows:

$$\frac{0}{F_2} < \frac{F}{F_2} < \frac{F_2}{F_2}$$

$$0 < \frac{F}{F_2} < 1$$

The above sequences of operation are reversed as the valve in control 16' is open from a full closed position to a wide open position.

Figure 9:
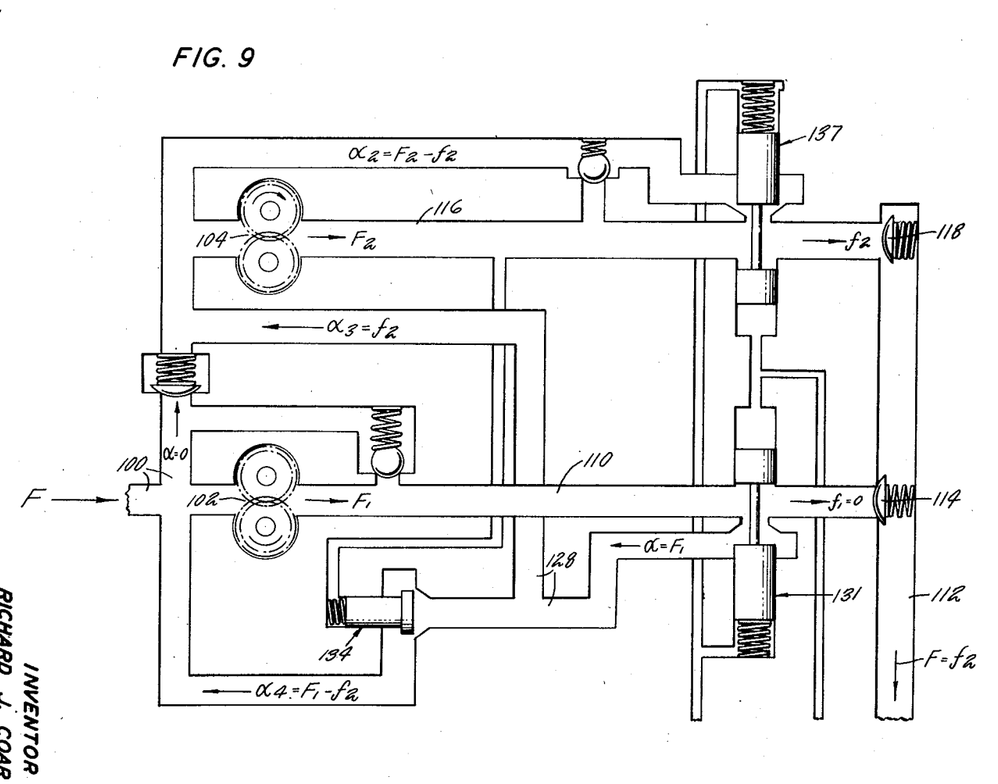
Fig. 9 is an enlarged schematic view of the dual fuel pump with its elements being shown in their respective positions when "series" operation obtains.

"Series" operation of the dual fuel pump 50 is characterized by flow leaving the pump through the check valve 118 only, by the pressure level $P_{105}$ obtaining at the discharge of the second stage pump 104 only, and by the pressure level at the discharge of the first stage pump 102 being common to the pressure level at the inlet to the second stage pump 104; said pressure level being held in fixed ratio to the total required pressure rise from the inlet passageway 100 to conduit 105. This mode of operation is particularly useful in pumping low viscosity fluids since it provides twice the discharge pressure that would otherwise be available from a particular type of pump.

The "transition" range of operation of the dual fuel pump 50 is characterized by flow being delivered from both first and second stage pumps 102 and 104 at the delivery pressure $P_{105}$ but with the pressure at the inlet of the second stage pump 104 being at a value which is intermediate to the values of the inlet and discharge pressures of the first stage pump 102.

Since it is normally desired to divide the required pressure rise between the two stage pumps 102 and 104, the maximum flow capable of being delivered under these conditions is obviously determined by the lower capacity stage pump. By designing the capacity of the second stage pump in accordance with this requirement and making the capacity of the first stage slightly larger to provide a finite flow for regulation by stage load control valve 134, "series" operation is always obtained as long as the delivered flow is less than the capacity of the second stage pump, and the most economical pump size is obtained.

"Parallel" operation of the dual fuel pump 50 is characterized by flow being delivered through both check valves 118 and 114, and by both stage pumps having a pressure rise equal to the pressure in the conduit 105 minus the pressure in inlet passageway 100, $P_{105}-P_{100}$.

As described above, the operation of this dual fuel pump is dependent on the flow demand of the valve in control 16' (or of the equivalent control 16) and not on any particular pressures. As long as the flow demand is low, the pump operation is in "series"; as the flow demand increases, the operation gradually passes through the "transition" range to the pump operation in "parallel," and the demand is satisfied as long as it is within the capabilities of the dual fuel pump 50.

In application to a turbine engine power plant it is convenient to directly drive the first and second stage pumps 102 and 104 at the same rotative speed relative to the engine by a suitable gearing. However, the relative capacities of the two pumps could be determined by reduction gearing between them, and further, the pumps could be driven by other sources of power than the engine.

When the first and second stage pumps are geared to a turbine engine, the pressure level in the dual fuel pump is determined by the pressure in conduit 18 which may be established, for example, by fuel nozzle characteristics, or the like. As described previously, the function of this dual fuel pump is determined by the parameter $F/F_2$. In engine operation this parameter may vary for any of several reasons. For example, during extremely low engine speeds such as starting, the flow F required may be in excess of the capacity of the second stage pump 104 so that "parallel" flow condition is obtained. At some high engine speeds the flow F varies according to the air density (altitude) at the engine air inlet and/or according to the amount of power extracted from the engine (by a propeller, for example). In these cases the ratio $F/F_2$ is low and a "series" flow obtained.

Figure 10:
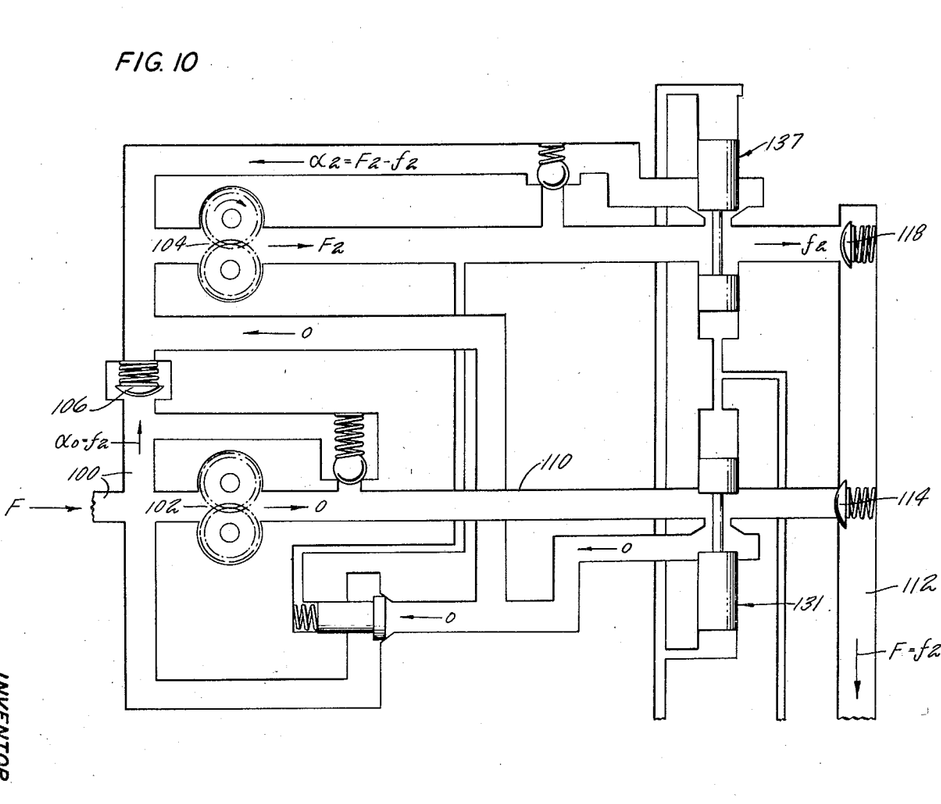
Fig. 10 is an enlarged schematic view of the dual fuel pump with its elements being shown in their respective positions when the first stage pump has failed or a failure having a similar result occurs.
Figure 11:
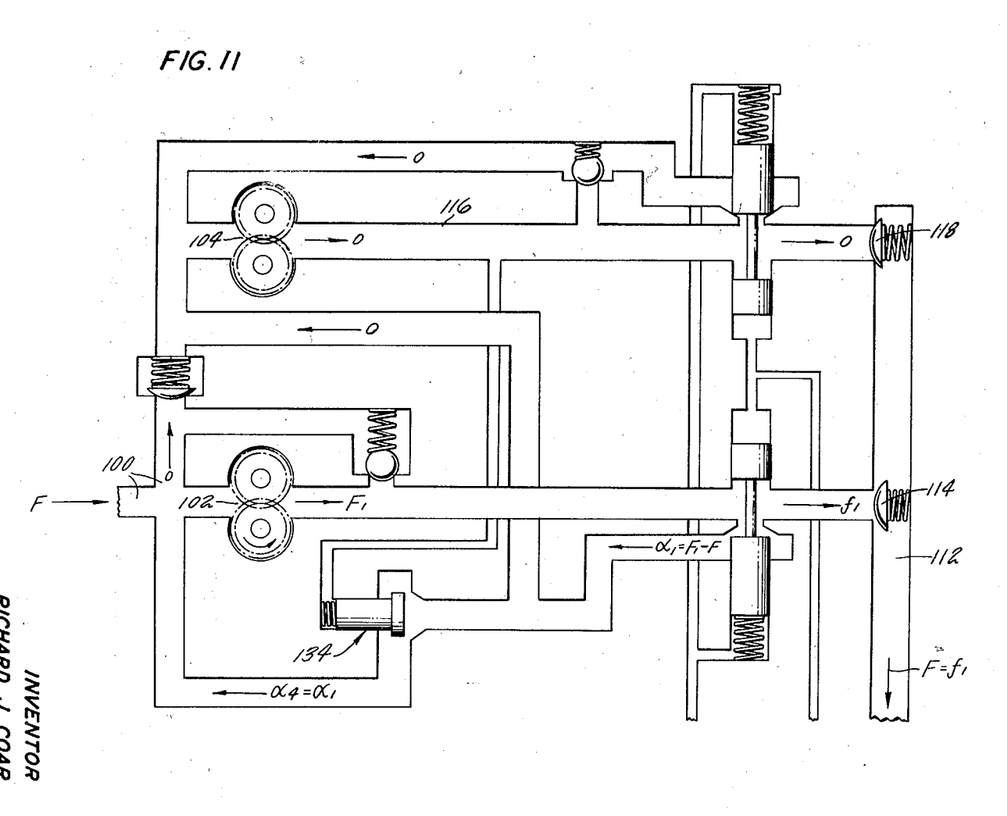
Fig. 11 is an enlarged schematic view of the dual fuel pump with its elements being shown in their respective positions when the second stage pump has failed or a failure having a similar result occurs.

In the event of a pressure failure in passageway 110, which may be caused by a failure of the first stage pump 102 or by the first stage regulating valve sticking in the open position; the check valve 114 closes to prevent loss of flow which is delivered through the check valve 118 to conduit 105. The position of the various valves in the dual fuel pump 50 in the event of this type of failure is shown in Fig. 10. The pressure regulation by the action of the second stage regulating valve is maintained at $P_{105}-P_{18}=\Delta 2$. Similarly, a pressure failure in passageway 116 causes check valve 118 to close. The position of the various valves in the dual fuel pump 50 in the event of this type of failure is shown in Fig. 11. Flow to the engine through check valve 114 is regulated by the first stage regulating valve which maintains $P_{105}-P_{18}=\Delta 1$.

Figure 13:
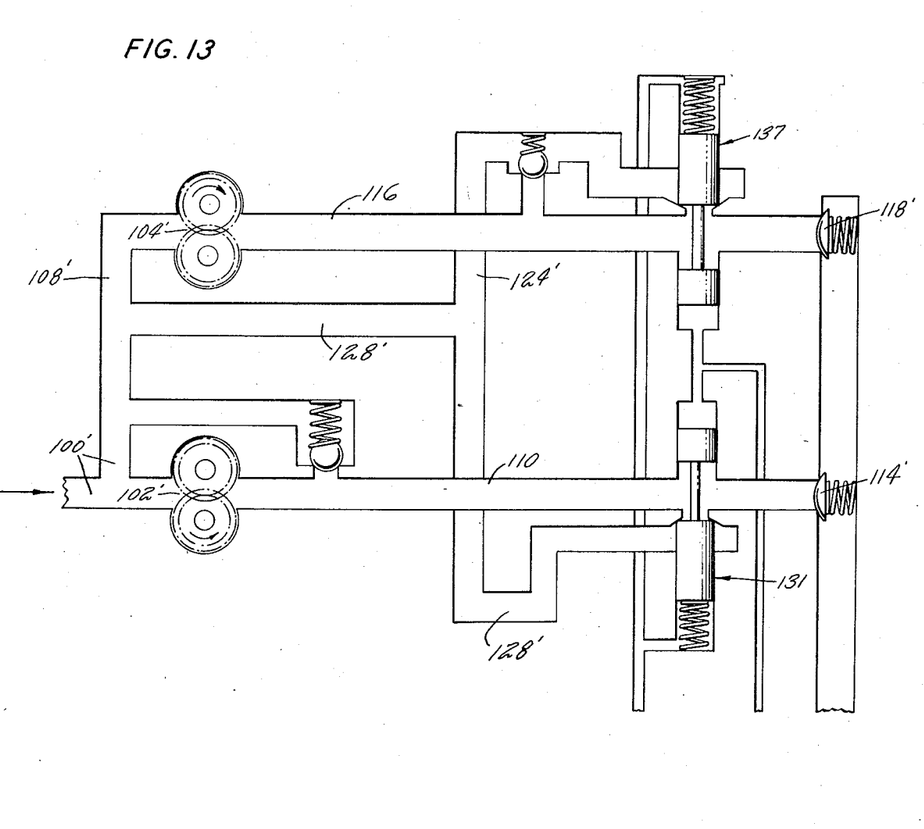
Fig. 13 is a view showing a modification of the dual fuel pump shown in Fig. 2.

In the case where two pumps are used each having a sufficient pressure rise for a particular application, that is, an application without need for a series flow to obtain a discharge pressure the sum of the pressure rises across each pump, the first and second stage regulating valves, 131 and 137, may be used in an arrangement as shown in Figure 13. Essentially, the difference in configuration between Figure 12 and Figure 2, is effected in Figure 12 by the removal of the stage load control valve 134 and its associated passageways 132 and 148, and the removal of check valve 106. With this arrangement as long as the flow required by the valve in control 16' is less than the capacity of the second stage pump 104' the required pressure differential $P_{105}-P_{18}$ is equal to $\Delta 2$ as controlled by the second stage regulating valve 137. This differential exceeds $\Delta 1$, thereby holding the first stage regulating valve 131 in a wide open position so that the first stage pump 102' discharges with no pressure rise, its flow being recirculated back to its inlet through passageways 128' and 100'. The flow bypassed by the second stage regulating valve 137 also returns to the inlet by way of the passageways 124' and 128', mixing first with fuel bypassed from the first stage regulating valve 131 so that the fuel temperature at the inlet of each pump does not become excessive.

When the flow demand of the valve in control 16' exceeds the capacity of the second stage pump 104', the first stage regulating valve 131 is caused to close by the corresponding loss in the pressure differential $P_{105}-P_{18}$. The first stage regulating valve 131 closes until $P_{110}$ is equal to $P_{105}$ and check valve 114' opens as said valve is closed further. When sufficient added flow is obtained through check valve 114', equilibrium is reached with the first stage regulating valve 126 bypassing only enough fuel to maintain the pressure differential $P_{105}-P_{18}$ equal to $\Delta 1$. Again, in this arrangement, a loss of pressure in either passageway 110 or 116 results in closure of the check valve 114' or 118', respectively, and the flow demand is met by the remaining operable combination.

A fuel pump and a fuel control of the kind referred to above, is shown in copending application Serial No. 284,518, of Richard J. Coar, filed April 26, 1952, for an Engine Control. Although a specific pump has been shown and described herein for purpose of illustration, it will be evident to those skilled in the art that the invention is capable of various modifications and adaptations within the scope of the appended claims.

I claim:

1. A fuel pumping device including a first and a second fuel pump, an inlet passageway to said pumps with a check valve in the inlet to the second pump, outlet passageways from said pumps, a check valve in the outlet passageway from said first pump, and a common delivery passageway for said inlets, a pressure balanced control valve in each of said outlet passageways, each pressure balanced control valve being balanced as to the pressure in its respective outlet passageway, and a bypass from each of said control valves to the inlet to said second pump downstream of the check valve, means responsive to a pressure differential for shifting said control valves, each of said control valves having a spring biasing the valve in one direction, one of said springs being slightly stronger than the other.

2. A fuel pumping device including a first and a second fuel pump, an inlet passageway to said pumps with a check valve in the inlet to the second pump, outlet passageways from said pumps, a check valve in the outlet passageway from said first pump, and a common delivery passageway for said outlets, a control valve in each of said outlet passageways, and a bypass from each of said control valves to the inlet to said second pump downstream of the check valve, means responsive to a pressure differential for shifting said control valves, a bypass from the control valve for one of said pumps to the pump inlet and a pressure responsive regulator valve in said bypass, said regulator valve being connected to the outlet passageway of the other pump and responsive to pressure changes therein.

3. A fuel pumping device including a first and a second fuel pump, an inlet passageway to said pumps with a check valve in the inlet to the second pump, outlet passageways from said pumps, a check valve in the outlet passageway from said first pump, and a common delivery passageway for said outlets, a pressure responsive control valve in each of said outlet passageways, and a bypass from each of said control valves to the inlet to said second pump downstream of the check valve, and means responsive to a pressure differential for shifting said control valves.

4. In combination, a first pump, a second pump, an inlet passageway connected to both pumps, a check valve in said passageway, an outlet passageway from said first pump, a check valve in said last named outlet passageway, an outlet passageway from said second pump, a common passageway connecting the two last named outlet passageways, a bypass passageway connecting the outlet passageway from said first pump to said inlet passageway at a point between the check valve and the inlet to the second pump, a pressure regulated valve located in the connection between said last named bypass passageway and the outlet passageway from said first pump, a second bypass passageway connecting the outlet passageway from said second pump to said inlet passageway, a second pressure regulated valve located in the connection between said last named second bypass passageway and the outlet passageway from said second pump, a third bypass passageway connecting said first named bypass passageway to said inlet passageway, a load control valve located in the third bypass passageway, said load control valve consisting of a piston slidable in a bore and a valve seat, one face of said piston coacting with said valve seat to form a variable orifice, and the other face of said piston being connected by a passageway to the outlet passageway of said second pump.

5. In combination, a first pump having an inlet and outlet, a second pump having an inlet and outlet, inlet passageway means connected to both pumps, a first check valve, said first check valve being located in said inlet passageway means permitting flow towards the inlet of said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway, said first connecting passageway connecting the outlet passageway from said first pump at a point between said second check valve and the outlet from said first pump to said inlet passageway means at a point between said first check valve and the inlet to said second pump, a first regulating valve, said first regulating valve being located in said last named first connecting passageway, said first regulating valve being biased to a closed position, said first regulating valve being responsive to a pressure differential for operation, a second connecting passageway, said second connecting passageway connecting the outlet passageway from said second pump to said inlet passageway means, a second regulating valve, said second regulating valve being located in said last named second connecting passageway, said second regulating valve being biased to a closed position, said second regulating valve being responsive to a pressure differential for operation.

6. In combination, a first pump, a second pump, inlet passageway means connected to both pumps, a first check valve in said passageway means permitting flow towards said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway connecting the outlet passageway from said first pump at a point between said second check valve and the first pump to said inlet passageway means at a point between said first check valve and the second pump, a first pressure balanced regulating valve located in said last named first connecting passageway, said first regulating valve being pressure balanced as to the pressure in the outlet passageway from said first pump, said first regulating valve being biased to a closed position, said first regulating valve being responsive to a pressure differential for operation, a second connecting passageway, said second connecting passageway connecting the outlet passageway from said second pump to said inlet passageway means, a second pressure balanced regulating valve, said second pressure balanced regulating valve being located in said last named second connecting passageway, said second regulating valve being pressure balanced as to the pressure in the outlet passageway from said second pump, said second regulating valve being biased to a closed position, said second regulating valve being responsive to a pressure differential for operation.

7. In combination, a first pump having an inlet and outlet, a second pump having an inlet and outlet, inlet passageway means connected to both pump inlets, a first check valve in said passageway permitting flow towards said second pump, an outlet passageway from said first pump, an outlet passageway from said second pump, a common outlet passageway connected to the two last named outlet passageways, a check valve between said common outlet passageway and the outlet from said first pump, a first connecting passageway connecting the outlet from said first pump to the inlet of said second pump, a first regulating valve located in said last named passageway, said first regulating valve being biased to a closed position, means having opposed movable surfaces for moving said first regulating valve, said means being responsive to a pressure differential for operation, means for directing a pressure to act on one movable surface and a pressure to act on the other movable surface, a second connecting passageway, said second connecting passageway connecting the outlet from said second pump to the inlet of said second pump, a second regulating valve located in said last named passageway, said second regulating valve being biased to a closed position, means having opposed movable surfaces for moving said second regulating valve, said last named means being responsive to a pressure differential for operation, means for directing a pressure to act on one movable surface of said last named means and a pressure to act on the other movable surface of said last named means.

8. In combination, a first pump having an inlet and outlet, a second pump having an inlet and outlet, inlet passageway means connected to both pump inlets, a check valve in said passageway means permitting flow towards the inlet of said second pump, an outlet passageway from said first pump, an outlet passageway from said second pump, a common outlet passageway connected to the two last named outlet passageways, a check valve between said common passageway and the outlet from said first pump, a connecting passageway connecting the outlet from said first pump to the inlet of said second pump, a first regulating valve located in said last named passageway, said first regulating valve being biased to a closed position, a first means having opposed movable surfaces, means forming with one of said surfaces of said first means a first expansible chamber, means forming with said other surface of said first means a second expansible chamber, said first means having opposed movable surfaces being connected to said first regulating valve for moving said valve, a second connecting passageway, said second connecting passageway connecting the outlet from said second pump to the inlet of said second pump, a second regulating valve located in said last named passageway, said second regulating valve being biased to a closed position, a second means having opposed movable surfaces, means forming with one of said surfaces of said last named second means a third expansible chamber, means forming with said other surface of said last named second means a fourth expansible chamber, said second means having opposed movable surfaces being connected to said second regulating valve for moving said valve, a passageway connected to said first chamber and said third chamber for directing a pressure thereto, a passageway connected to said second chamber and said fourth chamber for directing a pressure thereto.

9. In combination, a first pump having an inlet and outlet, a second pump having an inlet and outlet, inlet passageway means connected to both pumps, a first check valve, said first check valve being located in said inlet passageway means permitting flow towards the inlet of said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway, said first connecting passageway connecting the outlet passageway from said first pump at a point between said second check valve and the outlet from said first pump to said inlet passageway means at a point between said first check valve and the inlet to said second pump, a first regulating valve, said first regulating valve being located in said last named first connecting passageway, said first regulating valve being biased to a closed position, said first regulating valve being responsive to a pressure differential for operation, a first relief passageway, said first relief passageway connecting the outlet from said first pump to the inlet of said first pump, a first pressure relief valve, said first pressure relief valve being located in said last named passageway, a second connecting passageway, said second connecting passageway connecting the outlet passageway from said second pump to said inlet passageway means, a second regulating valve, said second regulating valve being located in said last named second connecting passageway, said second regulating valve being biased to a closed position, said second regulating valve being responsive to a pressure differential for operation, a second relief passageway, said second relief passageway connecting the outlet from said second pump to the inlet of said second pump, a second pressure relief valve, said second pressure relief valve being located in said last named passageway.

10. In combination, a first pump, a second pump, inlet passageway means connected to both pumps, a first check valve in said passageway means permitting flow towards said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway connecting the outlet passageway from said first pump at a point between said second check valve and the first pump to said inlet passageway means at a point between said first check valve and the second pump, a first pressure balanced regulating valve located in said last named first connecting passageway, said first regulating valve being pressure balanced as to the pressure in the outlet passageway from said first pump, said first regulating valve being biased to a closed position, said first regulating valve being responsive to a pressure differential for operation, a first relief passageway, said first relief passageway connecting the outlet from said first pump to the inlet of said first pump, a first pressure relief valve, said first pressure relief valve being located in said last named passageway, a second connecting passageway, said second connecting passageway connecting the outlet passageway from said second pump to said inlet passageway means, a second pressure balanced regulating valve, said second pressure balanced regulating valve being located in said last named second connecting passageway, said second regulating valve being pressure balanced as to the pressure in the outlet passageway from said second pump, said second regulating valve being biased to a closed position, said second regulating valve being responsive to a pressure differential for operation, a second relief passageway, said second relief passageway connecting the outlet from said second pump to the inlet of said second pump, a second pressure relief valve, said second pressure relief valve being located in said last named passageway.

11. In combination, a first pump having an inlet and outlet, a second pump having an inlet and outlet, inlet passageway means connected to both pump inlets, a first check valve in said passageway permitting flow towards said second pump, an outlet passageway from said first pump, an outlet passageway from said second pump, a common outlet passageway connected to the two last named outlet passageways, a check valve between said common outlet passageway and the outlet from said first pump, a first connecting passageway connecting the outlet from said first pump to the inlet of said second pump, a first regulating valve located in said last named passageway, said first regulating valve being biased to a closed position, means having opposed movable surfaces for moving said first regulating valve, said means being responsive to a pressure differential for operation, means for directing a pressure to act on one movable surface and a pressure to act on the other movable surface, a first relief passageway, said first relief passageway connecting the outlet from said first pump to the inlet of said first pump, a first pressure relief valve, said first pressure relief valve being located in said last named passageway, a second connecting passageway, said second connecting passageway connecting the outlet from said second pump to the inlet of said second pump, a second regulating valve located in said last named passageway, said second regulating valve being biased to a closed position, means having opposed movable surfaces for moving said second regulating valve, said last named means being responsive to a pressure differential for operation, means for directing a pressure to act on one movable surface of said last named means and a pressure to act on the other movable surface of said last named means, a second relief passageway, said second relief passageway connecting the outlet from said second pump to the inlet of said second pump, a second pressure relief valve, said second pressure relief valve being located in said last named passageway.

12. In combination, a first pump having an inlet and outlet, a second pump having an inlet and outlet, inlet passageway means connected to both pump inlets, a check valve in said passageway means permitting flow towards the inlet of said second pump, an outlet passageway from said first pump, an outlet passageway from said second pump, a common outlet passageway connected to the two last named outlet passageways, a check valve between said common passageway and the outlet from said first pump, a connecting passageway connecting the outlet from said first pump to the inlet of said second pump, a first regulating valve located in said last named passageway, said first regulating valve being biased to a closed position, a first means having opposed movable surfaces, means forming with one of said surfaces of said first means a first expansible chamber, means forming with said other surface of said first means a second expansible chamber, said first means having opposed movable surfaces being connected to said first regulating valve for moving said valve, a first relief passageway, said first relief passageway connecting the outlet from said first pump to the inlet of said first pump, a first pressure relief valve, said first pressure relief valve being located in said last named passageway, a second connecting passageway, said second connecting passageway connecting the outlet from said second pump to the inlet of said second pump, a second regulating valve located in said last named passageway, said second regulating valve being biased to a closed position, a second means having opposed movable surfaces, means forming with one of said surfaces of said last named second means a third expansible chamber, means forming with said other surface of said last named second means a fourth expansible chamber, said second means having opposed movable surfaces being connected to said second regulating valve for moving said valve, a passageway connected to said first chamber and said third chamber for directing a pressure thereto, a passageway connected to said second chamber and said fourth chamber for directing a pressure thereto, a second relief passageway, said second relief passageway connecting the outlet from said second pump to the inlet of said second pump, a second pressure relief valve, said second pressure relief valve being located in said last named passageway.

13. In combination, a first pump having an inlet and outlet, a second pump having an inlet and outlet, inlet passageway means connected to both pumps, a first check valve, said first check valve being located in said inlet passageway means permitting flow towards the inlet of said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway, said first connecting passageway connecting the outlet passageway from said first pump at a point between said second check valve and the outlet from said first pump to said inlet passageway means at a point between said first check valve and the inlet to said second pump, a first regulating valve, said first regulating valve being located in said last named first connecting passageway, said first regulating valve being biased to a closed position, said first regulating valve being responsive to a pressure differential for operation, a second connecting passageway, said second connecting passageway connecting the outlet passageway from said second pump to said inlet passageway means, a second regulating valve, said second regulating valve being located in said last named second connecting passageway, said second regulating valve being biased to a closed position, said second regulating valve being responsive to a pressure differential for operation, a passageway connecting said first connecting passageway at a point between said first regulating valve and the inlet to said second pump to the inlet of said first pump, a load control valve located in said last named passageway, said load control valve being controlled in accordance with the pressure difference existing between the pressure in said first connecting passageway and the pressure in said outlet passageway from said second pump.

14. In combination, a first pump, a second pump, inlet passageway means connected to both pumps, a first check valve in said passageway means permitting flow towards said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway connecting the outlet passageway from said first pump at a point between said second check valve and the first pump to said inlet passageway means at a point between said first check valve and the second pump, a first pressure balanced regulating valve located in said last named first connecting passageway, said first regulating valve being pressure balanced as to the pressure in the outlet passageway from said first pump, said first regulating valve being biased to a closed position, said first regulating valve being responsive to a pressure differential for operation, a second connecting passageway, said second connecting passageway connecting the outlet passageway from said second pump to said inlet passageway means, a second pressure balanced regulating valve, said second pressure balanced regulating valve being located in said last named second connecting passageway, said second regulating valve being pressure balanced as to the pressure in the outlet passageway from said second pump, said second regulating valve being biased to a closed position, said second regulating valve being responsive to a pressure differential for operation, a passageway connecting said first connecting passageway at a point between said first regulating valve and the inlet to said second pump to the inlet of said first pump, a load control valve located in said last named passageway, said load control valve being controlled in accordance with the pressure difference existing between the pressure in said first connecting passageway and the pressure in said outlet passageway from said second pump.

15. In combination, a first pump having an inlet and outlet, a second pump having an inlet and outlet, inlet passageway means connected to both pump inlets, a first check valve in said passageway permitting flow towards said second pump, an outlet passageway from said first pump, an outlet passageway from said second pump, a common outlet passageway connected to the two last named outlet passageways, a check valve between said common outlet passageway and the outlet from said first pump, a first connecting passageway connecting the outlet from said first pump to the inlet of said second pump, a first regulating valve located in said last named passageway, said first regulating valve being biased to a closed position, means having opposed movable surfaces for moving said first regulating valve, said means being responsive to a pressure differential for operation, means for directing a pressure to act on one movable surface and a pressure to act on the other movable surface, a second connecting passageway, said second connecting passageway connecting the outlet from said second pump to the inlet of said second pump, a second regulating valve located in said last named passageway, said second regulating valve being biased to a closed position, means having opposed movable surfaces for moving said second regulating valve, said last named means being responsive to a pressure differential for operation, means for directing a pressure to act on one movable surface of said last named means and a pressure to act on the other movable surface of said last named means, a passageway connecting said first connecting passageway at a point between said first regulating valve and the inlet to said second pump to the inlet of said first pump, a load control valve located in said last named passageway, said load control valve being controlled in accordance with the pressure difference existing between the pressure in said first connecting passageway and the pressure in said outlet passageway from said second pump.

16. In combination, a first pump having an inlet and outlet, a second pump having an inlet and outlet, inlet passageway means connected to both pumps, a first check valve, said first check valve being located in said inlet passageway means permitting flow towards the inlet of said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway, said first connecting passageway connecting the outlet passageway from said first pump at a point between said second check valve and the outlet from said first pump to said inlet passageway means at a point between said first check valve and the inlet to said second pump, a first regulating valve, said first regulating valve being located in said last named first connecting passageway, said first regulating valve being biased to a closed position by a first predetermined force, said first regulating valve being responsive to a pressure differential for operation, a second connecting passageway, said second connecting passageway connecting the outlet passageway from said second pump to said inlet passageway means, a second regulating valve, said second regulating valve being located in said last named second connecting passageway, said second regulating valve being biased to a closed position by a predetermined force which is greater than said first predetermined force, said second regulating valve being responsive to a pressure differential for operation.

17. In combination, a first pump, a second pump, inlet passage means connected to both pumps, a first check valve in said passage means permitting flow towards said second pump, an outlet passageway from said first pump, an outlet passageway from said second pump, a common outlet passageway connected to the two last named outlet passageways, a second check valve, said second check valve being located between said common outlet passageway and the outlet from said first pump, a first connecting passageway connecting the outlet passageway from said first pump at a point between said second check valve and the first pump to said inlet passageway means at a point between said first check valve and the second pump, a first pressure balanced regulating valve located in said last named first connecting passageway, said first regulating valve being pressure balanced as to the pressure in the outlet passageway from said first pump, said first regulating valve being biased to a closed position by a first predetermined force, said first regulating valve being responsive to a pressure differential for operation, a second connecting passageway, said second connecting passageway connecting the outlet passageway from said second pump to said inlet passageway means, a second pressure balanced regulating valve, said second pressure balanced regulating valve being located in said last named second connecting passageway, said second regulating valve being pressure balanced as to the pressure in the outlet passageway from said second pump, said second regulating valve being biased to a closed position by a predetermined force which is greater than said first predetermined force, said second regulating valve being responsive to a pressure differential for operation.

18. In combination, a first pump having an inlet and outlet, a second pump having an inlet and outlet, inlet passageway means connected to both pump inlets, a first check valve in said passageway permitting flow towards said second pump, an outlet passageway from said first pump, an outlet passageway from said second pump, a common outlet passageway connected to the two last named outlet passageways, a check valve between said common outlet passageway and the outlet from said first pump, a first connecting passageway connecting the outlet from said first pump to the inlet of said second pump, a first regulating valve located in said last named passageway, said first regulating valve being biased to a closed position by a first predetermined force, means having opposed movable surfaces for moving said first regulating valve, said means being responsive to a pressure differential for operation, means for directing a pressure to act on one movable surface and a pressure to act on the other movable surface, a second connecting passageway, said second connecting passageway connecting the outlet from said second pump to the inlet of said second pump, a second regulating valve located in said last named passageway, said second regulating valve being biased to a closed position by a predetermined force which is greater than said first predetermined force, means having opposed movable surfaces for moving said second regulating valve, said last named means being responsive to a pressure differential for operation, means for directing a pressure to act on one movable surface of said last named means and a pressure to act on the other movable surface of said last named means.

19. In a pumping device, a first pump, a second pump, said first pump having an inlet and an outlet, said second pump having an inlet and an outlet, an inlet passageway connected to the inlet of the first pump, an inlet passageway connected to the inlet of the second pump, a check valve located in the inlet passageway connected to said second pump, said check valve permitting flow only toward the inlet of said second pump, an outlet passageway connected to the outlet of said first pump, a check valve located in the outlet passageway connected to the outlet of said first pump, an outlet passageway connected to the outlet of said second pump, a common passageway connecting the two last named outlet passageways, means connecting said outlet passageway from the outlet of said first pump to the inlet of said second pump, said last named means including a normally closed valve, means associated with said valve and responsive to an operating pressure differential for moving said valve, means connecting the outlet passageway from the outlet of said second pump to the inlet of said second pump, said last named means including a normally closed valve, and means associated with said valve and responsive to an operating pressure differential for moving said valve.

20. In a pumping apparatus two pumps, said pumps being connected for parallel operation, the inlets of said pumps being connected to a common source and the outlets of said pumps being connected to a common discharge, a first check valve located in the inlet to said second pump, a second check valve being located in the outlet from said first pump, first means connecting the outlet of said first pump upstream of said second check valve to the inlet of said second pump downstream of said first check valve, second means connecting the outlet of said second pump to the inlet of said second pump, said last named two means being interposed to change the parallel connection of said pumps to a series connection, and means interposed between said first means and the inlet to said first pump for always maintaining the pressure rise across each pump equal to one half of the pressure rise of both pumps when they are connected in series.

21. In a pumping apparatus, a first pump, a second pump, each pump having an inlet and an outlet, and an inlet passageway connected to the inlets of said pumps, a check valve in the connection between the inlet passageway and the inlet to said second pump, an outlet passageway connected to the outlet of each pump, a common passageway connecting the outlets from said two pumps, a check valve located between the outlet of the first pump and the common passageway, a first regulating valve interposed between the outlet of the first pump and the inlet of the second pump, a second regulating valve, said second regulating valve being interposed between the outlet of the second pump and the inlet of the second pump, a load control valve interposed between said first named regulating valve and the inlet to said first pump, said first and second regulating valves being operated in response to a pressure differential for maintaining said differential at one of two selected values.

22. In a pumping apparatus, a first pump, a second pump, each pump having an inlet and an outlet, an inlet passageway connected to the inlets of said pumps, a check valve in the connection between the inlet passageway and the inlet to said second pump, an outlet passageway connected to the outlet of each pump, a common passageway connecting the outlets from said two pumps, a check valve located between the outlet of the first pump and the common passageway, a first regulating valve interposed between the outlet of the first pump and the inlet of the second pump, a second regulating valve, said second regulating valve being interposed between the outlet of the second pump and the inlet of the second pump, a load control valve interposed between said first named regulating valve and the inlet to said first pump, said first and second regulating valves being operated in response to a pressure differential for maintaining said differential at one of two selected values, said load control valve being responsive to the pressure leaving said first regulating valve and the pressure leaving said second pump.

References Cited in the file of this patent
UNITED STATES PATENTS

| | | |
|---|---|---|
| 2,440,371 | Holley | Apr. 27, 1948 |
| 2,545,856 | Orr | Mar. 20, 1951 |
| 2,599,701 | Eames | June 10, 1952 |
| 2,614,617 | Bobier | Oct. 21, 1952 |
| 2,617,361 | Neal | Nov. 11, 1952 |
| 2,665,637 | Lauck | Jan. 12, 1954 |